(12) United States Patent
Hall et al.

(10) Patent No.: US 8,346,718 B2
(45) Date of Patent: Jan. 1, 2013

(54) SYNCHRONIZING RECURRING EVENTS

(75) Inventors: Lyman Hall, Nampa, ID (US); Raja Annadurai, Boise, ID (US); Scott A. Jeide, Meridian, ID (US)

(73) Assignee: Extended Systems, Inc., Boise, ID (US)

( * ) Notice: Subject to any disclaimer, the term of this patent is extended or adjusted under 35 U.S.C. 154(b) by 3061 days.

(21) Appl. No.: 09/949,312

(22) Filed: Sep. 7, 2001

(65) Prior Publication Data

US 2003/0061433 A1 Mar. 27, 2003

(51) Int. Cl.
*G06F 7/00* (2006.01)
*G06F 17/00* (2006.01)

(52) U.S. Cl. .................................................. 707/610

(58) Field of Classification Search ............ 709/206, 709/201, 203, 228, 219; 707/201, 104, 203, 707/200, 610; 455/574; 395/200.78
See application file for complete search history.

(56) References Cited

U.S. PATENT DOCUMENTS

| | | | | |
|---|---|---|---|---|
| 5,974,238 A * | 10/1999 | Chase, Jr. | ....................... | 709/248 |
| 6,125,369 A * | 9/2000 | Wu et al. | ....................... | 707/201 |
| 6,205,448 B1 * | 3/2001 | Kruglikov et al. | ............ | 707/200 |
| 6,208,996 B1 * | 3/2001 | Ben-Shachar et al. | ..... | 707/104.1 |
| 6,272,545 B1 * | 8/2001 | Flanagin et al. | ............... | 709/228 |
| 6,295,541 B1 * | 9/2001 | Bodnar et al. | ................. | 707/203 |
| 6,370,566 B2 * | 4/2002 | Discolo et al. | ................. | 709/206 |
| 6,401,104 B1 * | 6/2002 | LaRue et al. | ................... | 707/203 |
| 6,694,335 B1 * | 2/2004 | Hopmann et al. | ............ | 707/201 |
| 6,757,696 B2 * | 6/2004 | Multer et al. | .................. | 707/201 |
| 2003/0131073 A1 * | 7/2003 | Lucovsky et al. | ............. | 709/219 |
| 2003/0190937 A1 * | 10/2003 | Karmi et al. | ................... | 455/574 |

OTHER PUBLICATIONS

"Method for Personal Digital Assistance Calendar Export Nomenclature", Mar. 1994, IBM Technical Disclosure, vol. 37, issue No. 3, p. 1 of 1.*

* cited by examiner

*Primary Examiner* — Chau Nguyen

(57) ABSTRACT

A system and method for synchronizing records stored in differing formats in a shared data environment. One aspect of the invention involves distinguishing a record without regard to its format. Once a record is introduced into the environment, it is detected. A record file is generated and associated with the event. A record file typically includes a record tag uniquely identifying a given record in the shared data environment and a record type indicating information such as whether or not the record represents a recurring event as well as the format of the record. A record file also contains data indicating the status of the particular event, that is, whether it is new, unchanged, modified, or deleted. When synchronizing, only those records with equivalent record tags are compared. The record type and status are then used to guide the synchronization of equivalent records.

26 Claims, 10 Drawing Sheets

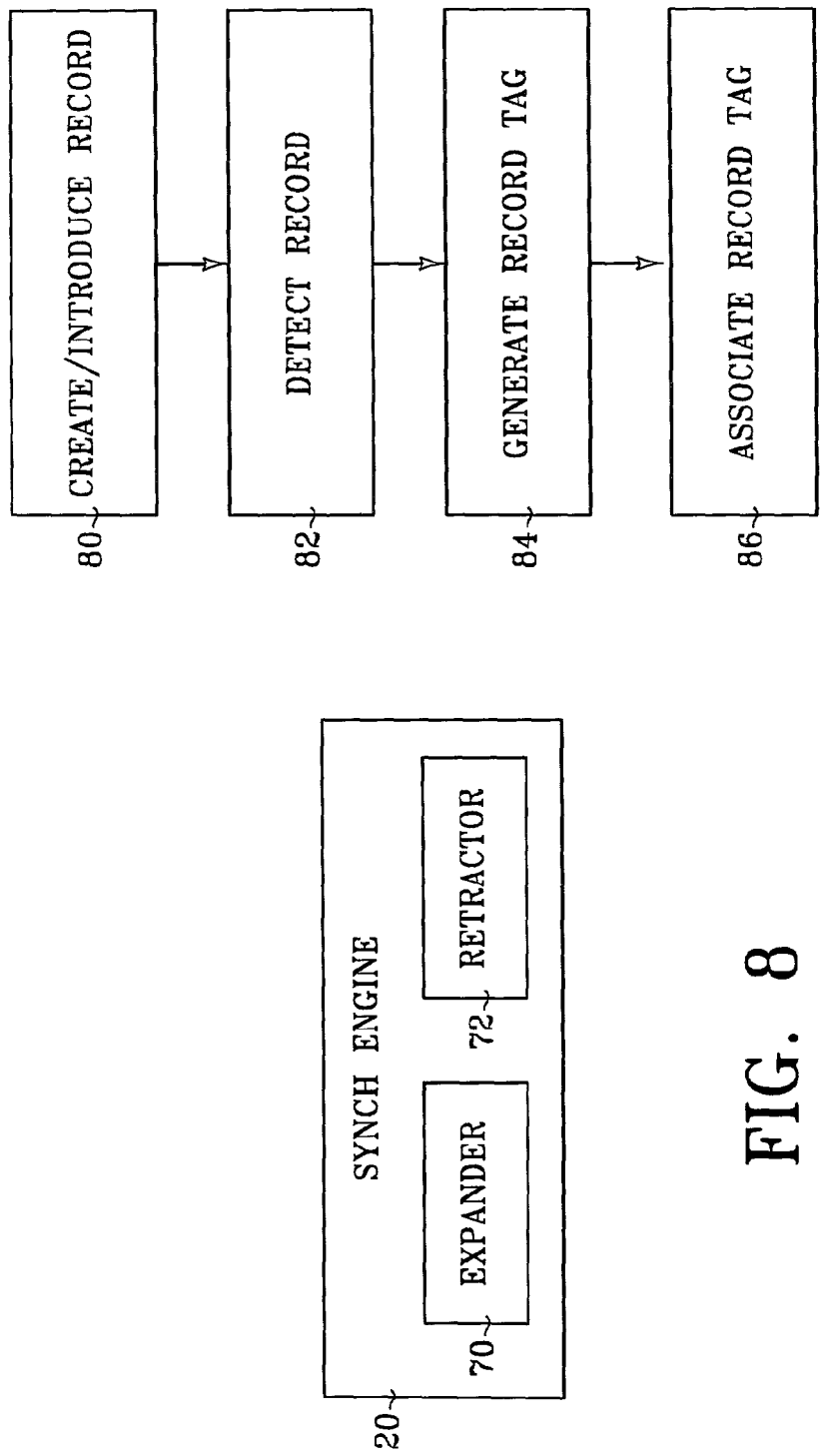

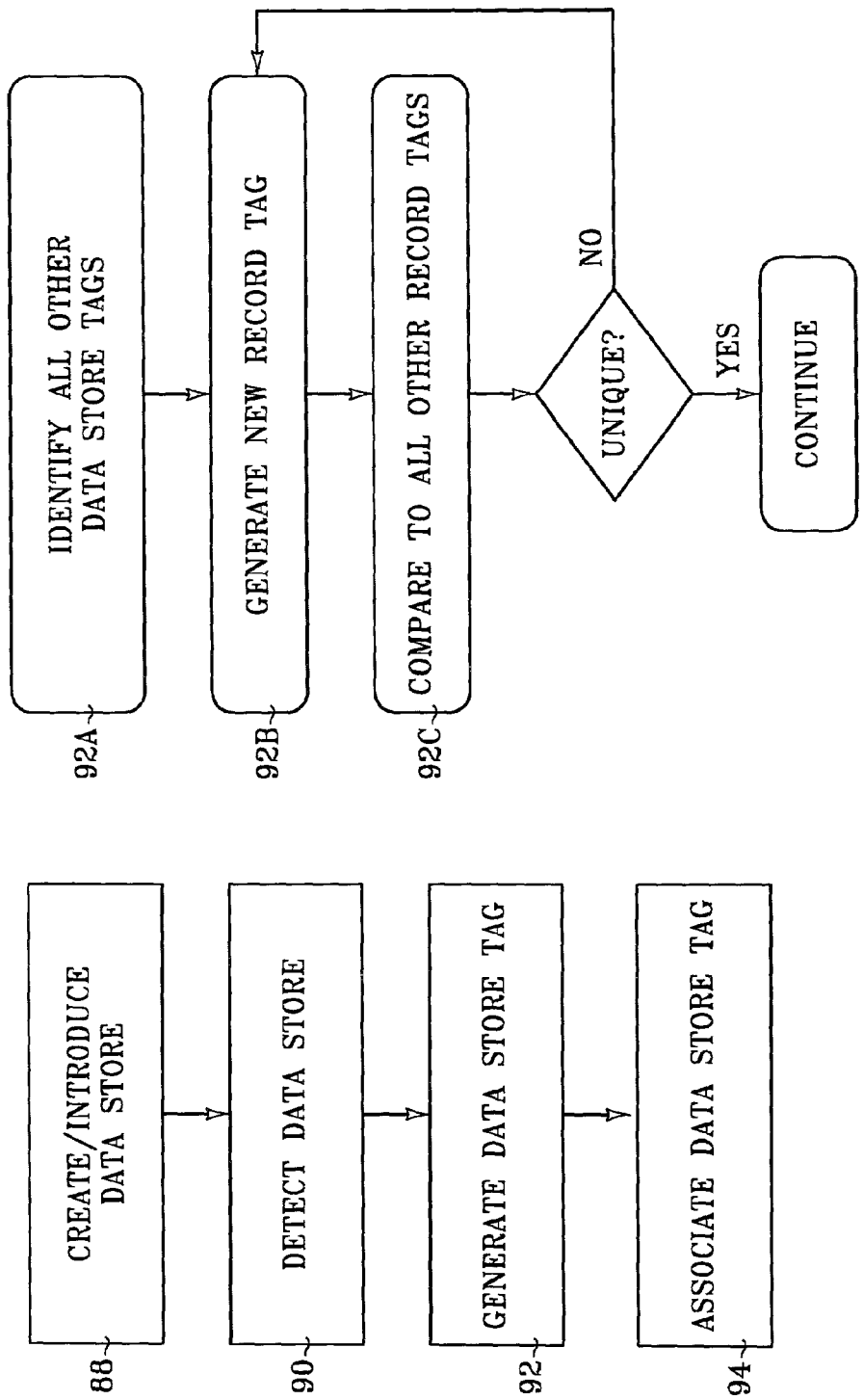

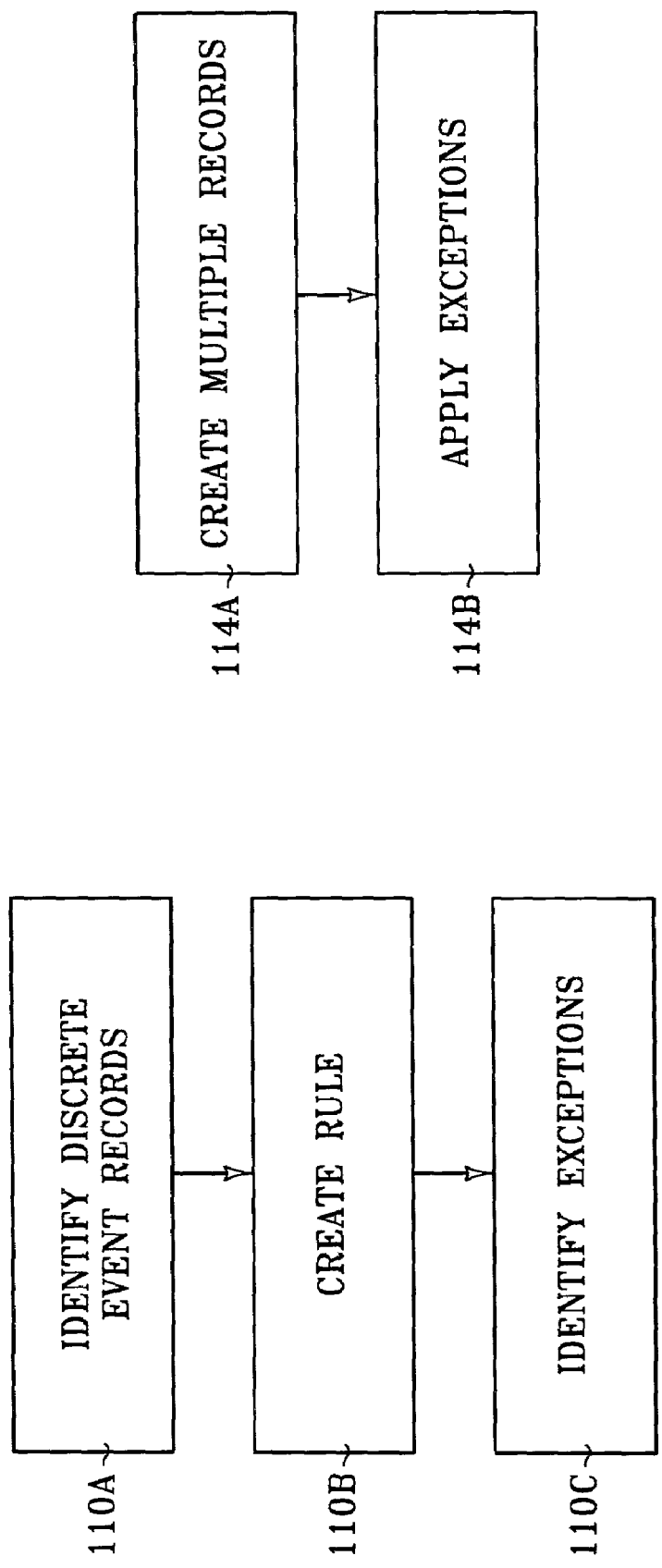

SYNCHRONIZING RECURRING EVENTS

FIELD OF THE INVENTION

This invention relates to synchronizing electronic data. Specifically, this invention is directed to a method and system for synchronizing recurring events.

BACKGROUND OF THE INVENTION

In today's computer networks, sharing data among devices has become desirable if not essential. Not only does the shared data need to be replicated on each device, but the replicated data must be synchronized so that changes made to one replica are reflected in all the others. Synchronization enables many users to work with their own local copy of shared data but have the shared data updated as if they were working on a single, centralized database. For shared data applications where users are geographically widely distributed, replication and synchronization are often the most efficient methods for effectively utilizing shared data.

In addition to desktop computers, workstations, and servers, modern computing environments often also include handheld computing devices that often weigh less than one pound and fit into a pocket, purse, or day planner. Modern computing environments range from private networks to the Internet. Although a wide range of application programs can be executed on handheld computers, shared data applications are particularly popular and well suited for these devices. Shared data applications include, among many others, electronic calendars and task lists, electronic mail organizers, and electronic address books.

Where the shared data applications on each device use the same file formats, synchronization is a relatively simple process. However, modern computing environments tend to be more complex, often having devices from multiple manufacturers, each with differing file formats making it difficult, if not impossible, to accurately synchronize shared data. This is often the case with calendaring applications. Records representing the same event are often stored in different formats on different devices. More specifically, some calendaring applications have the capability of representing a recurring appointment with a single complex record. A complex record typically contains a general rule and one or more exceptions. A general rule identifies information such as a beginning date and an ending date for the recurring appointment, the days of the week, month, or year on which the appointment falls, and a time for each of those days. An exception is a variance from the general rule. Exceptions fall into two categories: deletions—when an appointment does not occur, for example, on a given day or for a given week; and modifications—when the time, location, or other data for an appointment on a given day is changed. For example, a child's soccer practice might occur every Tuesday and Thursday from 5:30 to 6:30 PM in the months of March and April. There are, however, exceptions—the starting time for the second Tuesday in April will be 4:30 PM instead of 5:30, and there is no practice on the first Thursday in May.

Other less sophisticated applications represent a recurring event such as an appointment with a series of discrete records, one record for each appointment. In the soccer practice example fifteen discrete records are required—one record is for each practice on April 3, 5, 10, 12, 17, 19, 24, 26th and May 1, 8, 10, 15, 17, 22, 24, and 31st. Note, there is not a record for a practice on May 3, the first Thursday. Each record indicates a practice time of 5:30 to 6:30 PM except for April 10 when practice starts at 4:30 PM.

Conventional approaches typically fail when attempting to synchronize a recurring appointment represented by a single complex record on one device with the same recurring appointment stored as multiple discrete records on another device. What is needed is a system and method to accurately identify records representing recurring appointments as equivalent while facilitating the synchronization of each without regard to the format in which each is stored.

SUMMARY OF THE INVENTION

The present invention is directed to a system and method for synchronizing records stored in differing formats in a shared data environment. One aspect of the invention involves distinguishing a record without regard to its format. Once a record is introduced into the environment, it is detected. A record file is generated and associated with the record. A record file typically includes a record tag uniquely identifying a given record in the shared data environment and a record type indicating information such as whether or not the record represents a recurring event as well as the format of the record. A record file also contains data indicating the status of the particular record, that is, whether it is new, unchanged, modified, or deleted. When synchronizing, only those records with equivalent record tags are compared. The record type and status are then used to guide the synchronization of equivalent records.

Equivalent records, often times, are stored in different formats on different devices. To synchronize equivalent records stored in disparate formats, another aspect of the invention involves expanding a complex record to update a series of discrete records and retracing a series of discrete records to update a complex record.

DESCRIPTION OF THE DRAWINGS

FIG. 8 is a block diagram illustrating the logical components of the synch engine of FIG. 2.

FIG. 10 is a flow chart illustrating one method of identifying an event new to a shared data environment.

FIG. 13 is a flow chart illustrating one method of identifying a data store new to a shared data environment.

FIG. 14 is a flow chart further illustrating the act of generating from FIG. 13.

FIG. 17 is a flow chart further illustrating the act of retracting in FIG. 16.

FIG. 18 is a flow chart further illustrating the act of expanding in FIG. 16.

DETAILED DESCRIPTION OF THE INVENTION

INTRODUCTION: In today's mobile computing environment electronic records are replicated and shared across many devices. Applications operating on these devices store the electronic records in any number of varying formats. This is especially true for calendaring applications when storing records representing recurring events. It is expected that by associating a unique tag with each record or records that represent a recurring event, embodiments of the present invention will allow shared records stored in differing formats to be synchronized more effectively and more efficiently.

Although the various embodiments of the invention disclosed herein will be described with reference to the shared data environment 10 shown schematically in FIG. 1, the invention is not limited to use with shared data environment 10. The invention may be implemented in or used with any electronic system in which it is necessary or desirable to synchronize shared data. The following description and the drawings illustrate only a few exemplary embodiments of the invention. Other embodiments, forms, and details may be made without departing from the spirit and scope of the invention, which is expressed in the claims that follow this description.

Figure 1:
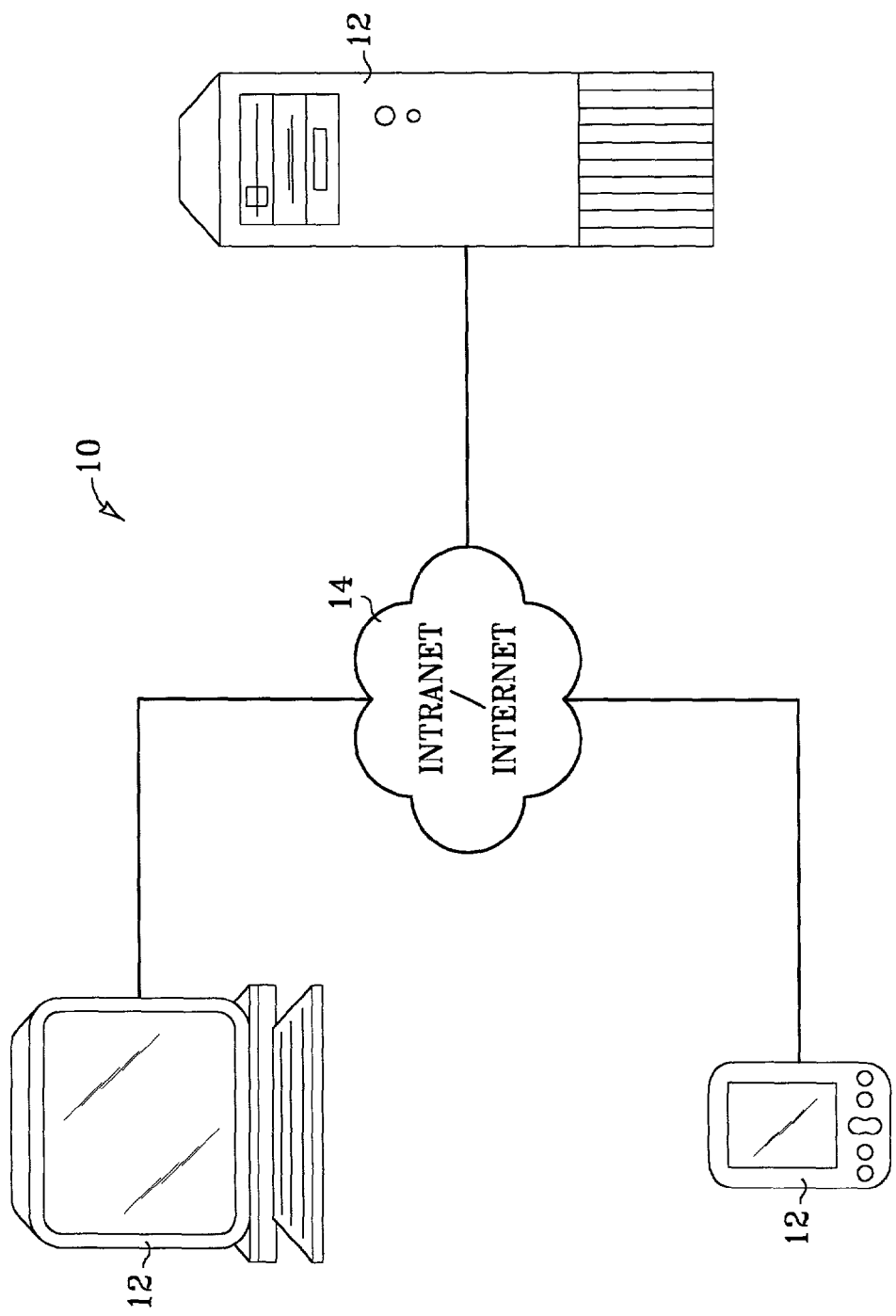
FIG. 1 is a schematic representation of a shared data environment having a personal computer, a PDA (Personal Digital Assistant) and a web server according to one embodiment of the present invention.

Referring to FIG. 1, computing system 10 represents generally an environment in which a variety of electronic devices 12 are linked. Devices 12 represent electronic devices such as, but not limited to, servers, personal computer workstations, and personal digital assistants. Communication link 14 interconnects devices 12 representing generally a cable, wireless, or remote connection via a telecommunication link, an infrared link, a radio frequency link, or any other connector or system that provides electronic communication between devices 12. Communication link 14 may represent an intranet, the Internet, or a combination of both. The path followed by link 14 between devices 12 in the schematic view of FIG. 1 represents the logical communication path between these devices, not necessarily the physical path between the devices. Devices 12 can be connected at any point and the appropriate communication path established logically between the devices. While each device 12 is shown attached to shared data environment 10, any device 12 may be removed and later reconnected to link 14. This is expected to be the case for devices such as PDA'a and laptop computers.

Figure 2:
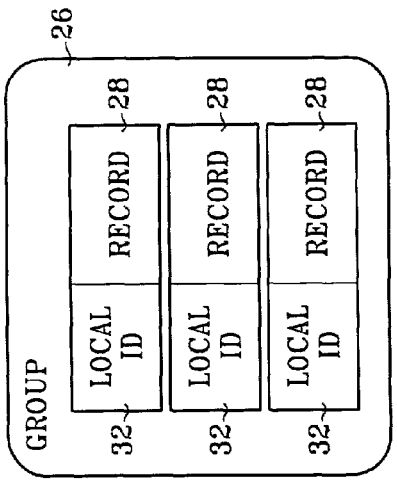
FIG. 2 is a block diagram illustrating the logical components of a device from FIG. 1.

COMPONENTS: Referring to FIG. 2, each device includes shared data application 16 and data store 18. Shared data application 16 represents generally an e-mail client, electronic calendar and task list, an electronic address book or any other application capable of sharing data. Data store 18 embodies a logical memory location for storing electronic records used by shared data application 16. Each record contained in data store 18 represents an event. Each event is an item of shared data such as an e-mail, an appointment, a task, or an address. While FIG. 2 illustrates device 12 as containing one shared data application 16 and one data store 18, device 12 can contain any number of shared data applications 16 and data stores 18. Moreover, shared data application 16 and data store 18 need not be located on device 12. They need only be accessible by device 12.

Each device 12 also includes synchronization (synch) engine 20, database 22 and tag generator 24. Synch engine 20 represents generally any programming capable of synchronizing data representing an event in two or more data stores 18. Database 22 contains a file (described below) for each event currently or previously represented by data in data store 18. The files each identify data representing a particular event within the shared data environment 10 while indicating the status of the data—that is, whether the data is new, unchanged, or has been modified or deleted. Tag generator 24 represents generally any programming capable of uniquely identifying data representing a particular event within shared data environment 10.

Figure 3:
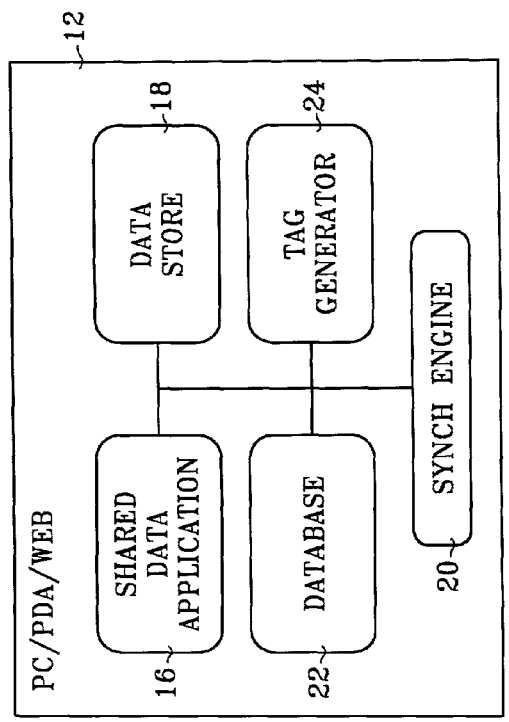
FIG. 3 is a block diagram further illustrating the data store of FIG. 2.
Figure 4:
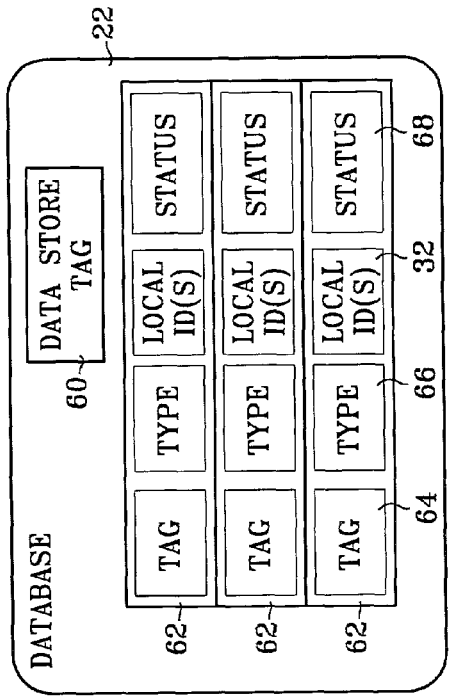
FIG. 4 is a block diagram further illustrating a group from FIG. 3.

FIG. 3 provides an example of a data store 18. Data store 18 includes groups 26. Groups 26 embody logical memory locations for containing data representing events of differing types. In the example of FIG. 3, data store 18 includes e-mail, calendar, task list, and address book groups 26. FIG. 4 illustrates the logical components of any given group 26. As shown, group 26 includes three records 28. Records 28 each include data representing a particular event. Each record 28 is associated with a local identifier 32. Local identifiers 32 include data identifying a particular record or records 28 within data store 18. Local identifiers 32 are usually created by shared data application 16 when storing a record 28 in data store 18. A local identifier 32 may be something as basic as a file name or other data appended to or associated with a record 28.

Figure 5:
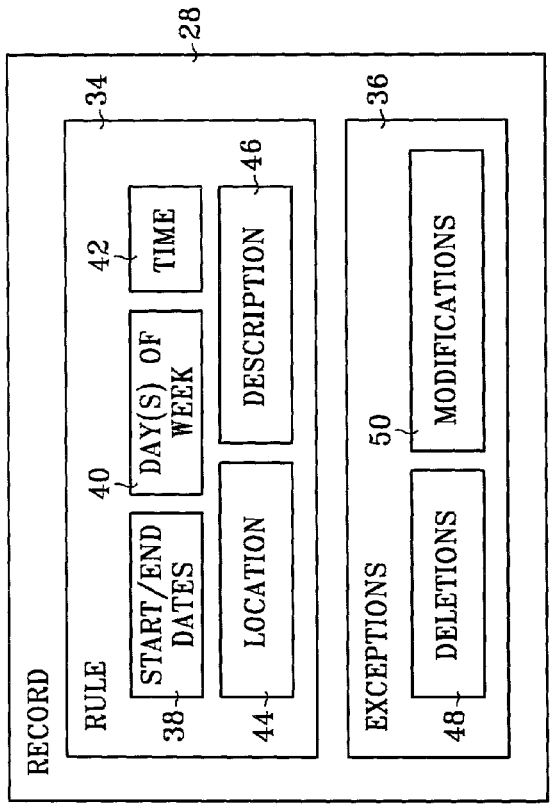
FIG. 5 is a block diagram illustrating a complex record representing a recurring event.

FIG. 5 provides an example of the logical components of a complex record 28 that represents a recurring event. Here record 28 includes rule 34 and exceptions 36. Rule 34 represents any data identifying the recurring event. In this case, rule 34 is for a recurring appointment and includes fields for start/end dates 38, day(s) of week 40, time 42, location 44, and description 56. For example, a child's soccer practice might occur every Tuesday and Thursday from 5:30 to 6:30 PM in the months of March and April at the elementary school. Start/end dates 38 represents data indicating March First and April Thirtieth. Day(s) of week 40, then represents data indicating Tuesday and Thursday. Time 42 represents data indicting 5:30 to 6:30 PM. Location 44 includes data indicating the Elementary school, and description 56 includes data indicating child's soccer practice.

Exceptions 36 represent any data indicating a variance, if any, from rule 34 and includes deletions 48 and modifications 50. Expanding the example above, the starting time for the second Tuesday in April will be 4:30 PM instead of 5:30, and there is no practice on the first Thursday in May. In this case, then, deletions 48 represent data indicating that there is no practice on the first Thursday in May, and modifications represent data indicating the change in time for the second Tuesday in April.

Figure 6:
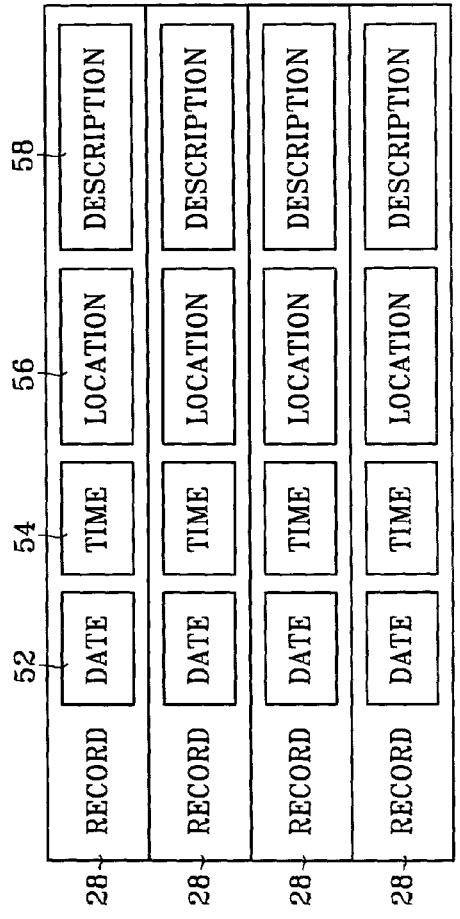
FIG. 6 is a block diagram illustrating a set of discrete records representing a recurring event.

FIG. 6 illustrates an example of a series of discrete records 28 representing a recurring event. In this example, each discrete record 28 represents a single appointment and includes fields for date 52, time 54, location 56, and description 58. To represent the recurring soccer practice in the example above, fifteen discrete records 28 are needed—one for each practice on April 3, 5, 10, 12, 17, 19, 24, 26th and May 1, 8, 10, 15, 17, 22, 24, and 31st (these dates are accurate for the year 2001). Date field 52 for each discrete record 28 includes data indicating the particular date of the soccer practice. Time field 54, location field 56, and description field 58 include the same data for each discrete record 28—except for the record 28 for April 10 where time 54 include data indicating a practice time of 4:30 to 5:30 PM. Because there is no practice on May 3 (the first Thursday in May), there is no discrete record 28 for that date.

Figure 7:
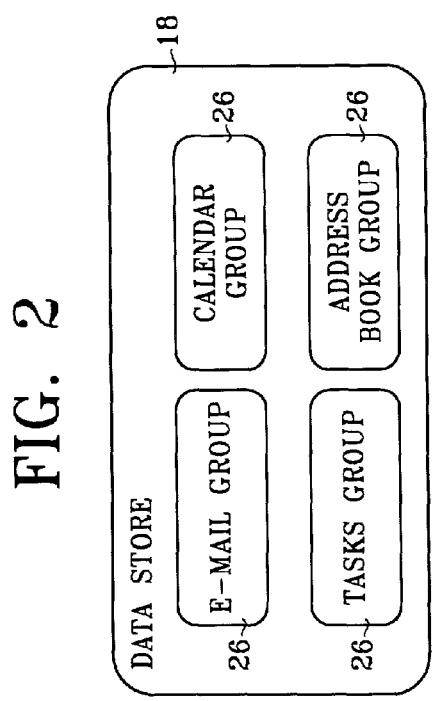
FIG. 7 is a block diagram further illustrating the database of FIG. 2.

FIG. 7 provides an example of the logical components of database 22 in FIG. 2. Here, database 22 includes data store tag 60 and record files 62. Data store tag 60 represents data used to uniquely identify a particular data store 18 within shared data environment 10. Each record file 62 represents data relating to and uniquely identifying a particular record or records 28 in data store 18 and shared data environment 10. Each record file 62 includes local identifier 32, record tag 64, record type 66, and record status 68. Each logical component 64, 66, and 68 of a given record file 62 is associated with a particular record or records 28 within a given data store 18. Record tag 64 represent data uniquely identifying a record or records 28 within shared data environment 10. Record type 66 represents data indicating the type of event represented by the record or records 28 as well as the format in which the record or records 28 are stored. For example, record type 66 might indicate that a record 28 represents a recurring event and is stored as a complex record. Record status 68 represents data indicating the status of a given record 28. For example, when a record 28 is first introduced into a data store 18 its status is "new". When a record 28 has been altered, its status is "modified." Other record status indicators include "deleted" and "unchanged."

Where an event is represented by a recurring record 28 as illustrated in FIG. 5, a record tag 64 is associated with that complex record. Where the recurring event is represented by a series of discrete records 28 as illustrated in FIG. 6, a common record tag 64 is associated with each of the discrete records 28. In this manner, each of the discrete records 28 representing a single recurring event can be identified using the common record tag 66.

FIG. 8 illustrates the logical components, expander 70 and retractor 72, of synch engine 20. When contained in a given data store 18, each record 28 is stored in a format native to a corresponding shared data application 16. Records 28 in different data stores 18, then, can be stored in any number of formats. As described above, a recurring event can be represented by a single complex record or by a series of discrete records. When changes are made to a complex record on one device 12, synch engine 20 must be capable of updating a series of discrete records representing the same recurring event on another device 12. Expander 70 represents generally any programming capable of expanding a single complex record into a series of discrete records according the complex record's rule 34 and exceptions 36. For example, a complex record 28 may include a rule 34 indicating that a meeting is to be held every Monday and Wednesday for a two-month period at a particular time. The exceptions 36, may indicate that a time modification for the second Monday in the first month and a deletion or absence of an appointment on the first Wednesday in the second month. In this example, expander 70 would create a series of distinct records 28, one for each appointment indicated in the rule 34. Expander 70 would then delete the record created for the first Wednesday of the second month and modify the time for the record created for the second Monday of the first month.

It is also the case that when changes are made to any one or more discrete records representing a recurring event on one device 12, synch engine 20 must be capable of updating a complex record representing the same recurring event on another device 12. Retractor 72, then, represents generally any programming capable of identifying a series of discrete records that represent a recurring event, and generating a rule 34 and exceptions 36 from a compilation of the data contained in each of the discrete records 28. For example, an examination of a series of discrete records 28 may reveal that the same appointment is being held on each Monday and Friday in a given month except for the second Friday. The examination also reveals that the appointment is being held at the same time on each of those dates except for the first Monday. In this case, retractor 72 would generate a rule 34 indicating that a recurring event is being held every Monday and Friday at a particular time during a particular month and exceptions 36 revealing that the modification in time on the first Monday and the deletion of the appointment on the second Friday.

The block diagrams of FIGS. 1-8 show the architecture, functionality, and operation of one implementation of the present invention. If embodied in software, each block may represent a module, segment, or portion of code that comprises one or more executable instructions to implement the specified logical function(s). If embodied in hardware, each block may represent a circuit or a number of interconnected circuits to implement the specified logical function(s).

Also, the invention can be embodied in any computer-readable medium for use by or in connection with an instruction execution system such as a computer/processor based system or other system that can fetch or obtain the logic from the computer-readable medium and execute the instructions contained therein. A "computer-readable medium" can be any medium that can contain, store, or maintain the programming of the present invention for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

Figures 11, 12:
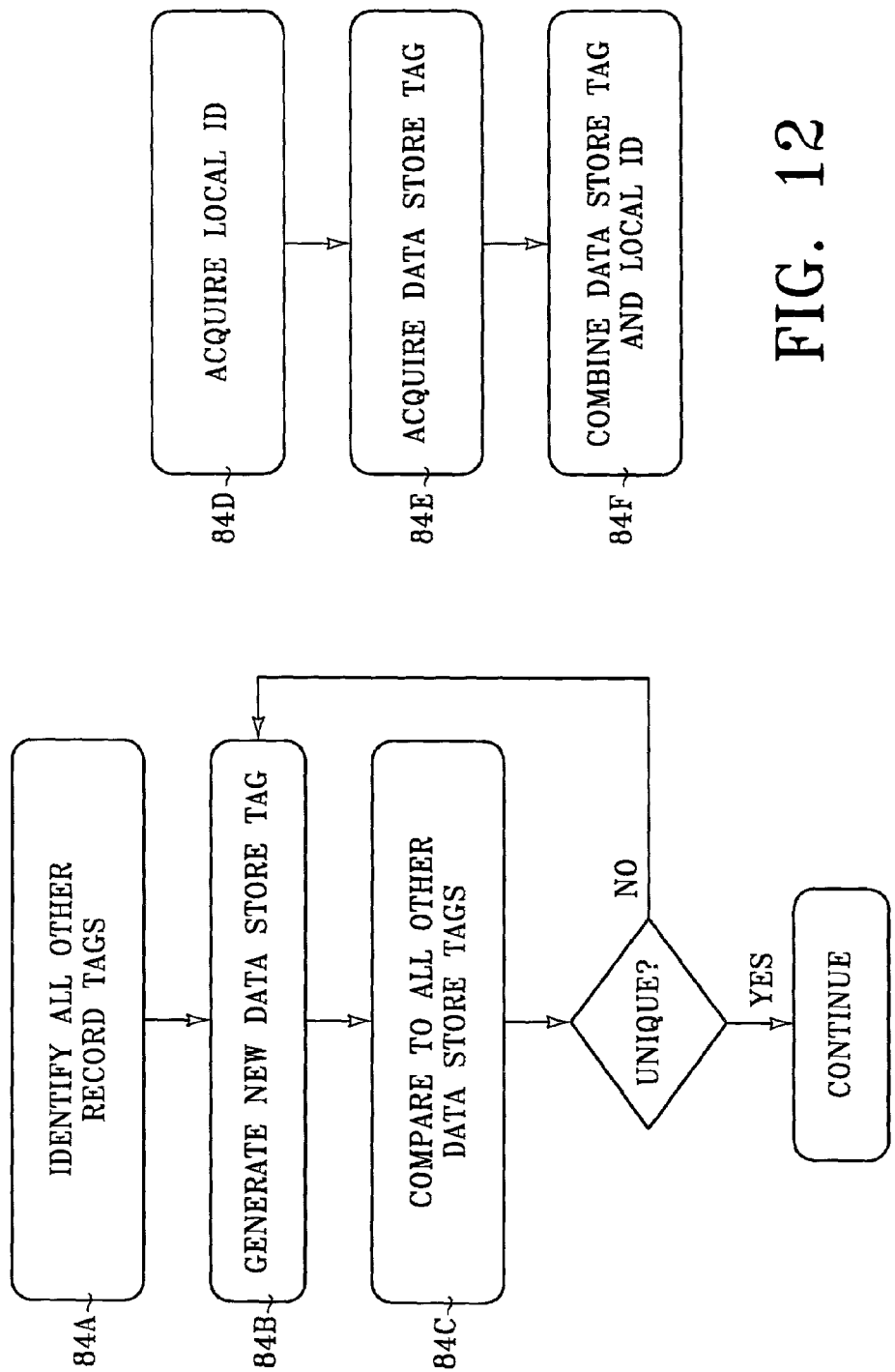
FIGS. 11 and 12 are flow charts each further illustrating the act of generating from FIG. 10.

OPERATION: The operation of synch engine 20 and tag generator 24 will now be described with reference to the block diagram of FIG. 9 and the flow diagrams of FIGS. 10-18. FIGS. 10-12 provide examples of the steps taken to uniquely identify a record or records 28 within shared data environment 10, while FIGS. 13 and 14 provide examples of uniquely identifying a data store 18 within shared data environment 10. FIGS. 15-18 provide examples of the steps taken to synchronize records contained in two data stores 18 and 18' in FIG. 9.

Figure 9:
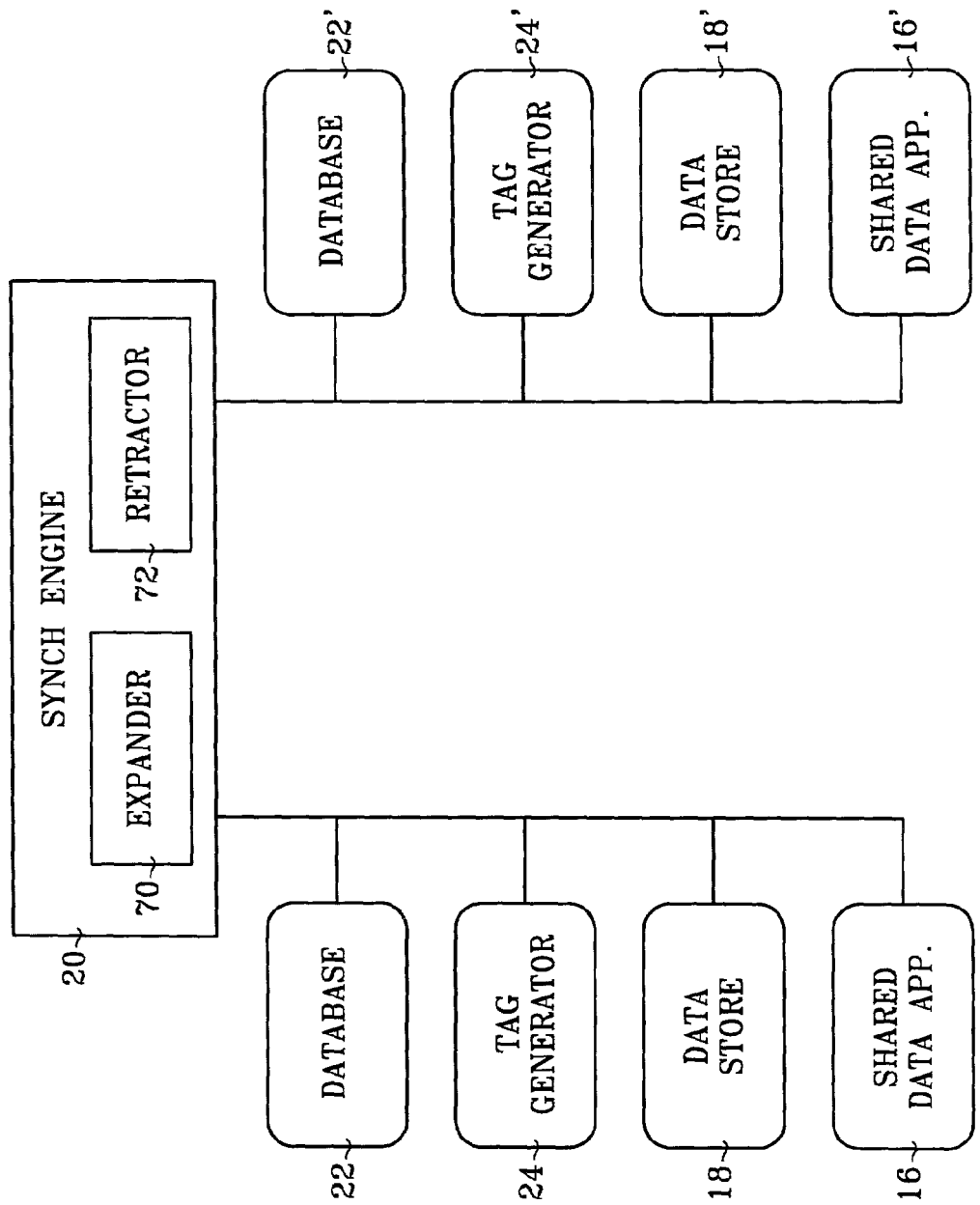
FIG. 9 is a block diagram illustrating a logical communication path between the components of two devices when synchronizing records.

Beginning with FIG. 9, only one synch engine 20 is needed to synchronize records 28 across any number of devices. FIG. 9 illustrates synch engine 20 in communication with databases 22 and 22', tag generators 26 and 26', data stores 18 and 18' and shared data applications 16 and 16'. Referring also now to FIG. 10, one of the shared data applications, 16 in this case, creates and introduces a new complex record 28 in corresponding data store 18 (step 80). Alternatively, a data store 18 containing new complex record 28 could be introduced into shared data environment 10. The corresponding tag generator 24 detects the record's introduction (step 82) and generates a record tag 64 unique to shared data environment 10 (step 84). Tag generator 24 then associates the generated record tag 64 with the detected complex record 28, updating the corresponding database 22 with a record file 62 for the new complex record 28 (step 86). Referring back to FIG. 7, that record file 62 would containing the generated record tag 64, a type 40 indicating a recurring event, and the local identifier 32 for the complex record 28.

Instead, in step 80 shared data application 16 could create and introduce series of discrete records 28 representing a recurring event. Tag generator 24 would then detect the records' introduction in step 82, generate a record tag 64 unique to shared data environment 10 in step 84, and then associate the record tag with all of the detected discrete records in step 86. Referring back to FIG. 7, step 86 would then involve creating a single record file 62 containing the generated record tag 64, a type 40 indicating a recurring event, and the local identifiers 32 for each of the discrete records 28.

FIG. 11 illustrates one embodiment of the steps taken to generate a record tag 64 unique to shared data environment 10. Communicating with each database 22, tag generator 24 identifies the record tags 64 and 64' associated with all other records 28 and 28' in shared data environment 10 (step 84A). Tag generator 24 then repeatedly generates a new record tag comparing that tag to the other record tags 64 and 64' until the new tag is found to be unique (steps 84B and 84C). FIG. 12 provides an alternative example of steps taken to generate a record tag in step 54. In FIG. 12, tag generator 24 acquires the local identifier(s) 32 for the new record(s) (step 84D) and the data store tag 60 for the data store 18 containing the new record(s) 28 (step 54E). Tag generator 24 then combines or concatenates the acquired data 32 and 36 creating a record tag 64 (step 54F). The embodiment illustrated in FIG. 12 has the benefit of not requiring tag generator 24 to be connected to shared data environment 10 when generating a record tag 64. Because the data store tag 60 is unique to the environment 10, a combination of the data store tag 60 and the local identifier 32 is also unique. Tag generator 24, then, can create a record tag 64 unique to shared data environment 10 while being disconnected from the environment 10.

Tag generator 24 may also use Message-Digest 5 (MD5) Algorithm to generate a unique record tag 64. The MD5 algorithm takes as input an electronic record representing for instance an appointment or e-mail message of arbitrary length and produces as output in the form of a 128-bit "fingerprint" in this case a record tag. It is surmised that it is computationally infeasible to produce two records having the same fingerprint. Consequently, record tag 64 generated in this manner will be unique not only to environment 10, but to all environments.

FIG. 13 illustrates the steps taken to generate a data store tag 60. Typically, a new data store 18 is introduced into shared data environment 10 when either a new device 12 containing a data store is connected to environment 10 or when created as a given shared data application 16 or 16' is installed on a device (step 88). In one embodiment, tag generator 24 detects the introduction of the data store 18 into shared data environment 10 (step 90) and generates a data store tag 60 unique to the shared data environment 10 (step 92). Tag generator 24 associates the new data store tag 60 with the new data store 18 (step 94). It is envisioned that tag generator 24 will accomplish step 94 by establishing a database 22 for the new data store 18. As described above, the database 22 will contain the new data store tag 60 and a record file 62 for each record 28 found in the new data store 18. Alternatively, data store tag 60 may be fixed within the particular shared data application 16 or 16'. As the application 16 or 16' is installed on the device, the data store tag 60 is made available within environment 10.

FIG. 14 provides an example of the steps taken to generate a data store tag in step 62 of FIG. 10. Communicating with each database 22 and 22' in shared data environment 10, tag generator 24 then identifies the date store tags 60 and 60' associated with all other data stores 18 and 18' in shared data environment 10 (step 92A). Tag generator 24 then repeatedly generates a new data store tag comparing that tag to the other data store tags 60 and 60' until the new tag is found to be unique (steps 92B and 92C).

Figure 15:
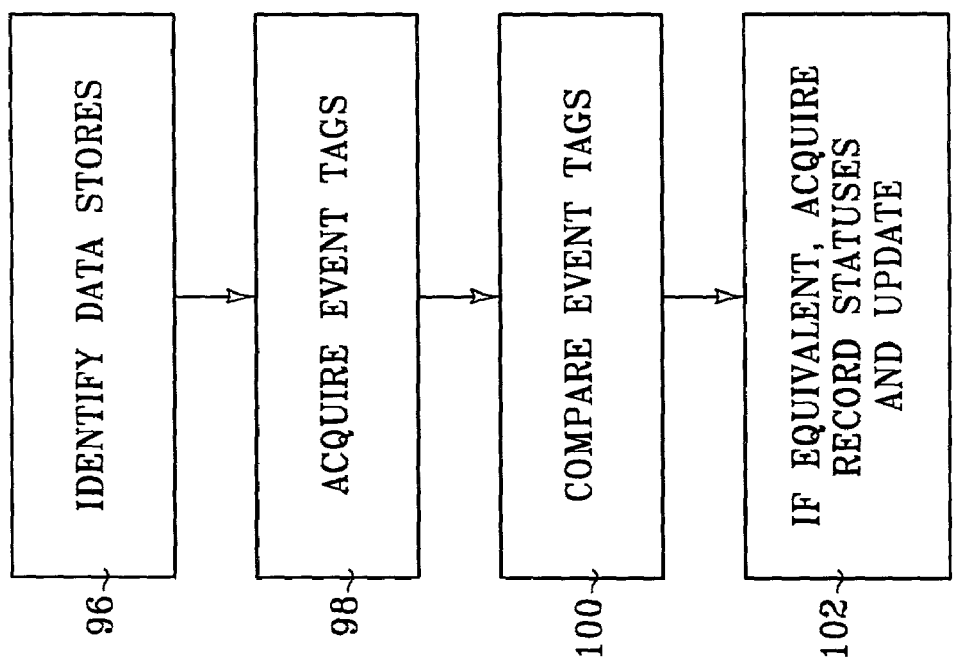
FIG. 15 is a flow chart illustrating synchronization of two data stores.

FIG. 15 illustrates the steps take to synchronize two data stores 18 and 18' in FIG. 9. Synch engine 20 identifies data stores 18 and 18' (step 96) and acquires the record files 62 and 62' from databases 22 and 22' for each record 28 and 28' contained in data stores 18 and 18' (step 98). Synch engine 20 compares each record tag 64 or 64' from one record file 62 or 62' with the record tags 64' or 64 from the other record file 62' or 62 until it finds a match (step 100). Upon finding a match, synch engine 20 compares the record status 68 and 68' for each record 28 and 28' associated with the matching record tags 64 and 64' updates the records 28 and 28' accordingly (step 102). It is envisioned that record tags 64 and 64' will be scalar—a programming term referring to a string of letters, numbers, and/or other alphanumeric characters. When comparing scalar record tags 64 and 64', synch engine 20 performs a scalar comparison of the record tags 64 and 64'. In other words, synch engine 20 determines whether a first record tag is equivalent to a second.

The following paragraphs describe steps taken to synchronize equivalent records 28 and 28'. As a precursor, it is important to note that equivalent records 28 and 28' are often time stored in differing formats understood by a given shared data application. Before synchronizing records 28 and 28', synch engine 20 first retrieves and converts each record 28 and 28' into a common or global format useable by synch engine 20. Where records 28 and 28' represent a recurring event, but record 28 is a complex record and records 28' are a series of discrete records, the conversion, as is discussed below, involves either expanding the complex record or retracting the series of discrete records. Were records 28 and 28' represent a non-recurring event, those records are merely converted into a common format. The converted records are then synchronized as described below and then returned to their original formats.

Figure 16:
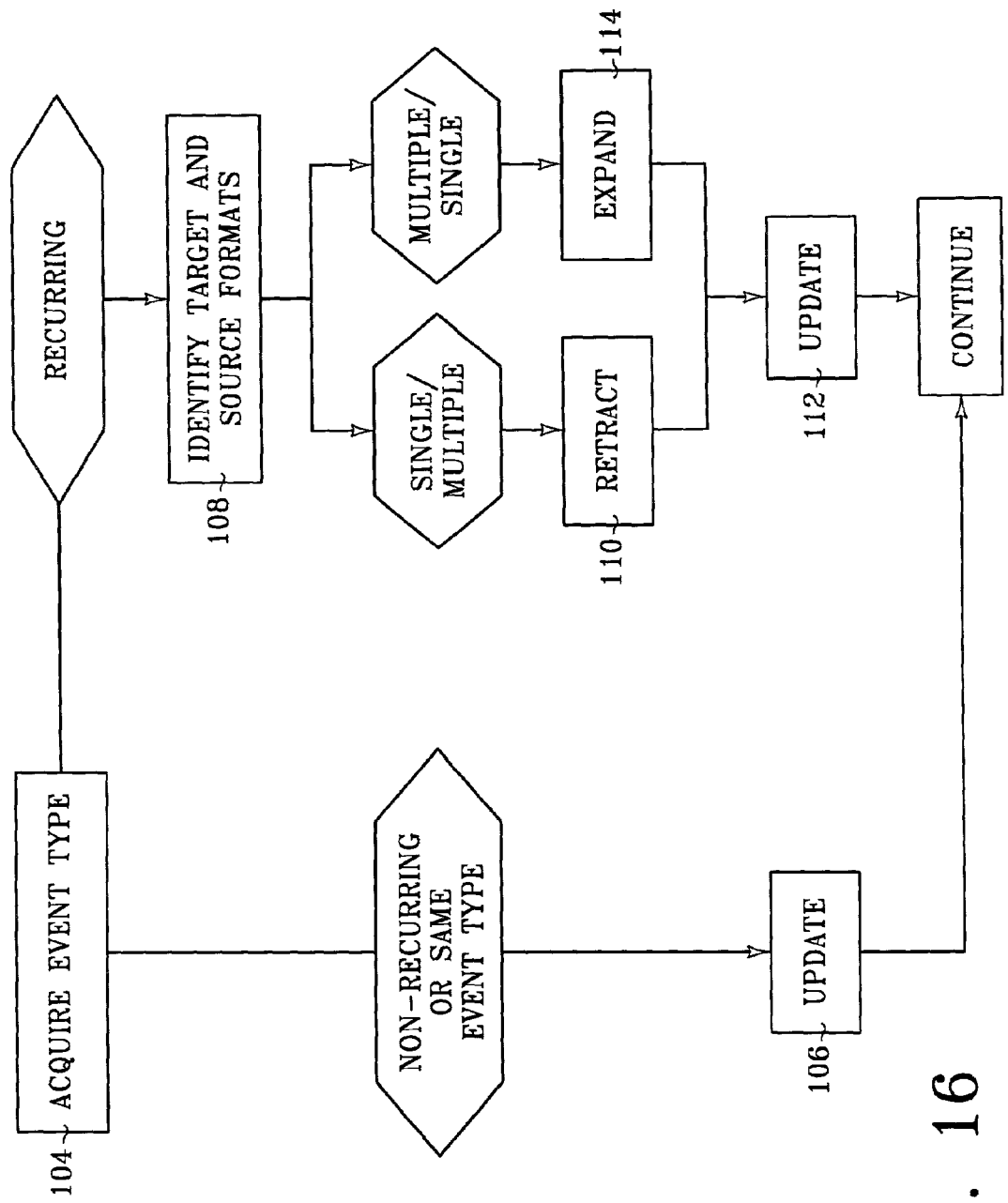
FIG. 16 is a flow chart further illustrating the act of updating in FIG. 15.

FIG. 16 further illustrates the steps taken to update records 28 and 28' found to be equivalent in step 100. Synch engine 20 acquires the record type 66 and 66' for the records to be synchronized. Where the record type 66 and 66' indicate that the events are non-recurring or are recurring but stored in the same format, the following describes how synch engine 20 might update records 28 and 28' in step 106 based upon the record status 68 and 68' of each:

- Modifying one record 28 to match the second record 28' if the record status 68 for the first record 28 is indicates that the first record 28 is new or unchanged and the record status 68' for the second record 28' indicates that the second record 28' has been modified. Modifying may also include restoring a deleted record 28 if the record status 68' for the other record 28' indicates that the record 30' has been modified at a time after the first record 28 was deleted.

- Deleting one record if the record status 68 for that record 28 is new or unchanged and the record status 68' for the second record 28' indicates that the second record 28' has been deleted. Deleting in this case may include deleting a record 28 if the record status 68 for that record 28 indicates that the record 28 has been modified while the record status 68' for the other record 28' indicates that it has been deleted at a time after the first record 28 was modified; and

- Modifying each record 28 and 28' in light of the other if the record status 68 and 68' for each indicates that each has been modified.

When a record 28 is new to shared data environment 10, comparing the new record's record tag 64 with the record tags 64' will not reveal a match. In this case sync engine 20 replicates the new record 28 in the other data store 18' and updates the other database 22' with a record file 64' for the replicated record 28'. When finished, each data store 18 and 18' contain identical records 28 and 28' associated with identical record tags 40 and 40'.

Record type 66 and 66' may indicate that the records 28 and 28' represent a recurring event and are stored in different formats—one stored as a complex record and the others as a series of discrete records. To synchronize a complex record 28 representing a recurring event with a series of discrete records 28' representing the same recurring event—the complex record 28 needs to be expanded and/or the series of discrete records 28 needs to be retracted. Referring still to FIG. 16, in this case synch engine 20, using record type 66 and 66', identifies the formats of the target and source records (step 108). The source record or records are the records 28 or 28' that have been modified. The target record or records, then, are the records 28' or 28 that are new or unchanged. Where the target record is a complex record 28 and the source records are a series of discrete records 28', synch engine 20 retracts the discrete records 28' (step 110) to update the complex record 28 (step 112). Where, the target records are a series of discrete records 28 and the source record is a complex record 28', synch engine 20 expands the complex record 28' (step 114) to update the discrete records 28 (step 112).

FIG. 17 illustrate an example of the steps taken to retract a series of discrete records 28' to form a complex record 28, while FIG. 18 illustrates the steps taken to expand a complex record 28 to form a series of discrete records 28'. Referring first to FIG. 17, retractor 72, using the record tag 64, identifies each discrete record 28 representing a particular recurring event (step 110A). Retractor 72 then compiles the data in each of those discrete records 28 and generates a rule 34 (step 110B). As described above, discrete records representing a recurring appointment each typically contain date 52, time 54, location, 56, and description 58 fields. Except for the date field 52, the majority of the discrete records representing a recurring event are usually identical. It is from this group of discrete records 28 that retractor 72 generates rule 34. Retractor 72 uses the remaining discrete records and the absence of any discrete records expected by the generated rule 34 to create exceptions 36 (step 110C). For example a generated rule 34 may call for an appointment to be held on every Monday and Thursday at a 4:00 PM in a given month. However, no discrete record exists for the second Thursday in that month. Consequently, retractor 72 creates exception 36 to include a deletion 48 for that date. A remaining discrete record 28 may include a time field 54 indicating 3:00 PM on the last Monday. Retractor 72 updates exception 36 to include a modification 50 indicating the time change for that date.

Referring to FIG. 18, to expand a complex record 28, expander 70, using the record's rule 34, generates a series of discrete records (step 112A). Using the preceding example, expander 70 generates a discrete record 28 for each appointment covered by the rule 34. Expander 70, then applies the complex record's exceptions 36 (step 112). For each deletion 48, expander 70 deletes a corresponding generated discrete record. For each modification 50, expander 70 modifies a corresponding generated discrete record. Using the Monday/Thursday meeting example from above, rule 34 of complex record 28 would include start/end dates field 38 indicating the first and last day of the particular month. The time field 42 would indicate 4:00 PM, and the day(s) of the week field 40 would indicate Monday and Thursday. Exceptions 36 would include a deletion for the second Thursday and a modification for the last Monday indicating a 3:00 PM meeting. Expander 70 would generate a discrete record for each Monday and for each Thursday in the given month in step 112A. In step 112B, expander 70 would then delete the discrete record for the second Thursday and modify the discrete record for the last Monday according to the exceptions 36.

The following provides an additional example of how synch engine 20 might update records 28 and 28' representing two recurring events based upon the record type 66 and 66' and record status 68 and 68' of each. In a first scenario, the record type 66 indicates that the recurring event is represented by a series of discrete records 28. The record type 66' indicates that the recurring event is represented by a complex record 28'. In this case, synch engine 20 expands the complex record 28' forming an updated series of discrete records 28—if:
1. the record status 38 for the complex record 28 indicates that the record 28 has been modified; and
2. the record status 68' for the discrete records 28' indicate that the records 28' are new or unchanged.

In a second scenario the record type 66 indicates that the recurring event is represented by a complex record 28. The record type 66' indicates that the recurring event is represented by a series of discrete records 28'. In this case, synch engine 20 retracts the series of discrete records 28' forming an updated complex record 28—if:
1. the record status 38 for the complex record 28 indicates that the record 28 is new or unchanged; and
2. the record status 68' for the discrete records 28 indicates that one or more of the discrete records 28 have been modified.

In a third scenario the record type 66 indicates that the recurring event is represented by a complex record 28, while the record type 66' indicates that the recurring event is represented by a series of discrete records 28'. However, the record status 68 and 68' for records 28 and 28' indicate that the records 28 and 28' have been modified. In this third case, synch engine 20
1. expands the complex record 28 forming a series of discrete records;
2. compares the expanded records with the discrete records 28' and updates each discrete record 28' to reflect any differences; and
3. retracts the updated series of discrete records 28' forming an updated complex record 28.

Alternatively synch engine 20 might:
1. retract the series of discrete records 28' forming a complex record;
2. compare the complex record formed by the retraction with the complex record 28 and update the complex record 28 to reflect differences;
3. expand the updated complex record 28 forming an updated series of discrete records 28'.

Although the flowcharts of FIGS. 7-18 show a specific order of execution, the order of execution may differ from that which is depicted. For example, the order of execution of two or more blocks may be scrambled relative to the order shown. Also, two or more blocks shown in succession in FIGS. 7-18 may be executed concurrently or with partial concurrence. All such variations are within the scope of the present invention. The present invention has been shown and described with reference to the foregoing exemplary embodiments. It is to be understood, however, that other forms, details, and embodiments may be made without departing from the spirit and scope of the invention, which is defined in the following claims.

What is claimed is:

1. A method for distinguishing data representing an event in a shared data environment, the method being implemented by one or more computers executing one or more programs, comprising:
   detecting data representing an event new to the shared data environment;
   generating a record file for the event, the record file including a record tag and a record type, the record type including data indicating that the event is recurring and indicating a format of the data representing the event, the format being selected from a plurality of formats that include a complex record format and a series of discrete records format; and
   associating the generated record file with the data representing the event.

2. The method of claim 1, wherein:
   the record type indicates that the event is a recurring event and the data representing the recurring event includes a series of discrete records;
   the act of generating comprises generating a single record file for all of the discrete records; and
   the act of associating comprises associating the single record file with all of the discrete records.

3. The method of claim 1, wherein:
   the record type indicates that the event is a recurring event and the data representing the recurring event includes a complex record;
   the act of generating comprises generating a record file for the complex record; and
   the act of associating comprises associating the generated record file with the complex record.

4. The method of claim 1, wherein the act of generating comprises:
   identifying all other record tags in the shared data environment; and
   repeatedly generating a new record tag until the generated record tag is different from each of the other identified record tags.

5. The method of claim 1, wherein the data representing the event is associated with one or more local identifiers and is contained in a data store and the act of generating comprises:
   acquiring at least one local identifier for the data representing the event;
   acquiring a data store tag associated with the data store; and
   generating a record tag for the event by combining the acquired local identifier with the acquired data store tag.

6. A computer program product for distinguishing data representing an event in a shared data environment, the product comprising a non-transitory computer useable medium having computer readable instructions thereon for:
   generating a record file for the event, the record file including a record tag and a record type, the record type including data indicating that the event is recurring and indicating a format of the data representing the event, the format being selected from a plurality of formats that include a complex record format and a series of discrete records format; and
   associating the generated record file with the data representing the event.

7. The product of claim 6, wherein
   the record type indicates that the event is a recurring event and the data representing the recurring event includes a series of discrete records;
   the instruction for generating comprise instructions for generating a single record file for all of the discrete records; and
   the instructions for associating comprise instructions for associating the single generated record file with all of the discrete records.

8. The product of claim 6, wherein
   the record type indicates that the event is a recurring event and the data representing the recurring event includes a complex record;
   the instructions for generating comprise instructions for generating a record file for the complex record; and
   the instructions for associating comprises instructions for associating the generated record file with the complex record.

9. The product of claim 6, wherein the instructions for generating comprise instructions for:
   identifying all other record tags in the shared data environment; and
   repeatedly generating a new record tag until the generated record tag is different from each of the other identified record tags.

10. The product of claim 6, wherein the data representing the event is associated with one or more local identifiers and is contained in a data store and the instructions for generating comprise instructions for:
    acquiring at least one local identifier for the data representing the event;
    acquiring a data store tag associated with the data store; and
    generating a record tag for the event by combining the acquired local identifier with the acquired data store tag.

11. A method for synchronizing data representing recurring events in a shared data environment, the method being implemented by one or more computers executing one or more programs, comprising:
    acquiring a first record tag, a first record type, and a first record status each associated with data representing a first recurring event, the first record type indicating a format of the data representing the first recurring event, the format being selected from a plurality of formats that include a complex record format and a series of discrete records format;
    acquiring a second record tag, a second record type, and a second record status each associated with a second recurring event, the second record type indicating a format of the data representing the second recurring event, the format being selected from a plurality of formats that include a complex record format and a series of discrete records format;
    comparing the first and second record tags; and
    synchronizing the data representing the first and second recurring events according to the first and second record types and record statuses only if the first and second record tags are equivalent.

12. The method of claim 11, wherein the act of synchronizing comprises expanding the data representing the second recurring event into a series of discrete records and replacing the data representing the first recurring event with the expanded data if:
    the record status for the first recurring event indicates that the first recurring event is new or unchanged;
    the record type for the first recurring event indicates that the data representing the first recurring event includes a series of discrete records;
    the record status for the second recurring event indicates that the second recurring event has been modified; and
    the record type for the second recurring event indicates that the data representing the second recurring event includes a complex record.

13. The method of claim 12 wherein the complex record includes a rule and exceptions and wherein the act of expanding comprises generating a series of discrete records according to the rule and exceptions.

14. The method of claim 11, wherein the act of synchronizing comprises retracting the data representing the second recurring event to form a complex record and replacing the data representing the first recurring event with the retracted data if:
the record status for the first recurring event indicates that the first recurring event is new or unchanged;
the record type for the first recurring event indicates that the data representing the first recurring event includes a complex record;
the record status for the second recurring event indicates that the second recurring event has been modified; and
the record type for the second recurring event indicates that the data representing the second recurring event includes a series of discrete records.

15. The method of claim 14, wherein the act of retracting comprises generating a rule and exceptions, if any, by compiling the data in each of the discrete records and forming a complex record from the generated rule and exceptions.

16. The method of claim 11 further comprising:
discovering events new to the shared data environment; and
for each discovered event, generating a record tag, noting a record type and associating that record tag and record type with data representing the discovered event, the noted record type indicates whether data representing the discovered event includes a complex record or a series of discrete records.

17. The method of claim 16, wherein the act of generating comprises:
identifying all other record tags in the shared data environment; and
repeatedly generating a new record tag until the generated record tag is different from each of the other identified record tags.

18. The method of claim 16, wherein the shared data environment includes two or more data stores and data representing each event in the shared data environment is contained within one of the data stores and is associated with one or more local identifiers and wherein the act of generating comprises:
identifying the data store containing the data representing the discovered event;
acquiring at least one local identifier for the data representing the discovered event;
acquiring a data store tag associated with the data store; and
generating a record tag for the discovered event by combining the acquired local identifier with the acquired data store tag.

19. A computer program product for synchronizing data representing recurring events in a shared data environment, the product comprising a non-transitory computer useable medium having computer readable instructions thereon for:
acquiring a first record tag, a first record type, and a first record status each associated with data representing a first recurring event, the first record type indicating a format of the data representing the first recurring event, the format being selected from a plurality of formats that include a complex record format and a series of discrete records format;
acquiring a second record tag, a second record type, and a second record status each associated with a second recurring event, the second record type indicating a format of the data representing the second recurring event, the format being selected from a plurality of formats that include a complex record format and a series of discrete records format;
comparing the first and second record tags; and
synchronizing the data representing the first and second recurring events according to the first and second record types and record statuses only if the first and second record tags are equivalent.

20. The product of claim 19, wherein the instructions for synchronizing comprise instructions for expanding the data representing the second recurring event into a series of discrete records and replacing the data representing the first recurring event with the expanded data if:
the record status for the first recurring event indicates that the first recurring event is new or unchanged;
the record type for the first recurring event indicates that the data representing the first recurring event includes a series of discrete records;
the record status for the second recurring event indicates that the second recurring event has been modified; and
the record type for the second recurring event indicates that the data representing the second recurring event includes a complex record.

21. The product of claim 20, wherein the complex record includes a rule and exceptions and wherein the instructions for expanding comprise instructions for generating a series of discrete records according to the rule and exceptions.

22. The product of claim 19, wherein the instructions for synchronizing comprise instructions for retracting the data representing the second recurring event to form a complex record and replacing the data representing the first recurring event with the retracted data if:
the record status for the first recurring event indicates that the first recurring event is new or unchanged;
the record type for the first recurring event indicates that the data representing the first recurring event includes a complex record;
the record status for the second recurring event indicates that the second recurring event has been modified; and
the record type for the second recurring event indicates that the data representing the second recurring event includes a series of discrete records.

23. The product of claim 22, wherein the instructions for retracting comprise instructions for generating a rule and exceptions, if any, by compiling the data in each of the discrete records and forming a complex record from the generated rule and exceptions.

24. The product of claim 19, further comprising instructions for:
discovering events new to the shared data environment; and
for each discovered event, generating a record tag, noting a record type and associating that record tag and record type with data representing the discovered event, the noted record type indicates whether data representing the discovered event includes a complex record or a series of discrete records.

25. The product of claim 24, wherein the instructions for generating comprise instructions for:
identifying all other record tags in the shared data environment; and
repeatedly generating a new record tag until the generated record tag is different from each of the other identified record tags.

26. The product of claim 24, wherein the shared data environment includes two or more data stores and data representing each event in the shared data environment is contained within one of the data stores and is associated with one or more local identifiers and wherein the instructions for generating comprise instructions for:
   identifying the data store containing the data representing the discovered event;
   acquiring at least one local identifier for the data representing the discovered event;
   acquiring a data store tag associated with the data store; and
   generating a record tag for the discovered event by combining the acquired local identifier with the acquired data store tag.

* * * * *